US012487897B2

(12) United States Patent
Gao et al.

(10) Patent No.: US 12,487,897 B2
(45) Date of Patent: Dec. 2, 2025

(54) SUSPECTED ABNORMAL LOG DIAGNOSIS

(71) Applicant: International Business Machines Corporation, Armonk, NY (US)

(72) Inventors: Lei Gao, Xian (CN); Jin Wang, Xian (CN); A Peng Zhang, Xian (CN); Kai Li, Xian (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/391,995

(22) Filed: Dec. 21, 2023

(65) Prior Publication Data
US 2025/0208961 A1    Jun. 26, 2025

(51) Int. Cl.
*G06F 11/22*     (2006.01)
*G06F 9/54*     (2006.01)

(52) U.S. Cl.
CPC .......... *G06F 11/2268* (2013.01); *G06F 9/547* (2013.01)

(58) Field of Classification Search
CPC .............................. G06F 11/2268; G06F 9/547
USPC ....................................................... 714/47.1
See application file for complete search history.

(56) References Cited

U.S. PATENT DOCUMENTS

| 9,891,979 | B2 | 2/2018 | Liu |
| 10,963,531 | B2 | 3/2021 | Shribman et al. |
| 2014/0059388 | A1* | 2/2014 | Patiev ................. G06F 11/0781 |
| | | | 714/E11.029 |
| 2020/0160230 | A1 | 5/2020 | Wang |
| 2023/0004750 | A1 | 1/2023 | Wang |

FOREIGN PATENT DOCUMENTS

| CN | 114741271 A | 7/2022 |
| CN | 115687010 A | 2/2023 |

OTHER PUBLICATIONS

"Coefficient", Baidu, Oct. 1989, 3 pages.
NGINX. "What Is a Reverse Proxy Server?", retrieved from web https://web.archive.org/web/20230828215534/https://www.nginx.com/resources/glossary/reverse-proxy-server/, dated Aug. 28, 2023, 2 pages.

* cited by examiner

*Primary Examiner* — Yair Leibovich
(74) *Attorney, Agent, or Firm* — Joseph P. Curcuru

(57) ABSTRACT

An approach for collecting diagnostic information, associated with a software system, based on identifying an abnormal log. The approach predicts a first time interval associated with a current log message based on one or more trained models and a first previous log message. The approach determines if a log is a suspected abnormal log based on the time interval. The approach, responsive to the log being a suspected abnormal log, executes actions of collecting additional diagnostic information based on a baseline diagnostic information collection rate, determines if the log is no longer a suspected abnormal log based at least on a second time interval. The approach, responsive to the log no longer being a suspected abnormal log, returns to the baseline diagnostic information collection rate.

20 Claims, 3 Drawing Sheets

US 12,487,897 B2

SUSPECTED ABNORMAL LOG DIAGNOSIS

TECHNICAL FIELD

The present disclosure relates generally to the field of log message diagnosis, and more specifically, intelligently managing information collection for a suspected abnormal log.

BACKGROUND

A log is an important mechanism for recording the execution status and health state of a software system. If errors or exceptions occur in the software system, logs usually provide developers with first-hand information of an associated problem. A good log output frequently provides important clues and directions for developers to solve problems illuminated by the log output.

Typically, a log will be created with entries tagged with a level type assigned to each log message based on user and/or developer configuration. For example, a log message can be assigned a level type such as DEBUG, INFO, WARN, ERROR, AUDIT, etc. In a production environment, log output often comprises INFO, WARN and ERROR messages.

Generally, INFO messages are ignored because many INFO messages simply describe the normal operation of the software system and DEBUG messages will not be output because DEBUG messages tend to be voluminous, usually printing an excessive amount of information that can impact system performance.

Typically, DEBUG level messages will require reproducing the issue with either DEBUG messages enabled, or a DEBUG build of the associated application. Accordingly, once a problem occurs in a software system, a log of INFO, ERROR or WARN messages does not provide sufficient information for developers to determine and correct the problem.

BRIEF SUMMARY

According to an embodiment of the present invention, a computer-implemented method for collecting diagnostic information, associated with a software system, based on identifying an abnormal log, the computer-implemented method comprising: predicting, by the one or more processors, a first time interval associated with a current log message based on one or more trained models and a first previous log message; determining, by the one or more processors, if a log is a suspected abnormal log based on the time interval; and responsive to the log being a suspected abnormal log, executing, by the one or more processors, actions comprising: collecting, by the one or more processors, additional diagnostic information based on a baseline diagnostic information collection rate; determining, by the one or more processors, if the log is no longer a suspected abnormal log based at least on a second time interval; and responsive to the log no longer being a suspected abnormal log, returning, by the one or more processors, to the baseline diagnostic information collection rate.

According to an embodiment of the present invention, a computer program product for collecting diagnostic information, associated with a software system, based on identifying an abnormal log, the computer program product comprising: one or more non-transitory computer readable storage media and program instructions stored on the one or more non-transitory computer readable storage media, the program instructions comprising: program instructions to predict a first time interval associated with a current log message based on one or more trained models and a first previous log message; program instructions to determine if a log is a suspected abnormal log based on the time interval; and responsive to the log being a suspected abnormal log, program instructions to execute actions comprising: program instructions to collect additional diagnostic information based on a baseline diagnostic information collection rate; program instructions to determine if the log is no longer a suspected abnormal log based at least on a second time interval; and responsive to the log no longer being a suspected abnormal log, program instructions to return to the baseline diagnostic information collection rate.

According to an embodiment of the present invention, a computer system for collecting diagnostic information, associated with a software system, based on identifying an abnormal log, the computer system comprising: one or more computer processors; one or more non-transitory computer readable storage media; and program instructions stored on the one or more non-transitory computer readable storage media, the program instructions comprising: program instructions to predict a first time interval associated with a current log message based on one or more trained models and a first previous log message; program instructions to determine if a log is a suspected abnormal log based on the time interval; and responsive to the log being a suspected abnormal log, program instructions to execute actions comprising: program instructions to collect additional diagnostic information based on a baseline diagnostic information collection rate; program instructions to determine if the log is no longer a suspected abnormal log based at least on a second time interval; and responsive to the log no longer being a suspected abnormal log, program instructions to return to the baseline diagnostic information collection rate.

Other aspects and embodiments of the present invention will become apparent from the following detailed description, which, when taken in conjunction with the drawings, illustrate by way of example the principles of the invention.

BRIEF DESCRIPTION OF THE DRAWINGS

The drawings included in the present disclosure are incorporated into, and form part of, the specification. The drawings illustrate embodiments of the present disclosure and, along with the description, explain the principles of the disclosure. The drawings are only illustrative of certain embodiments and do not limit the disclosure.

DETAILED DESCRIPTION

Figure 1:
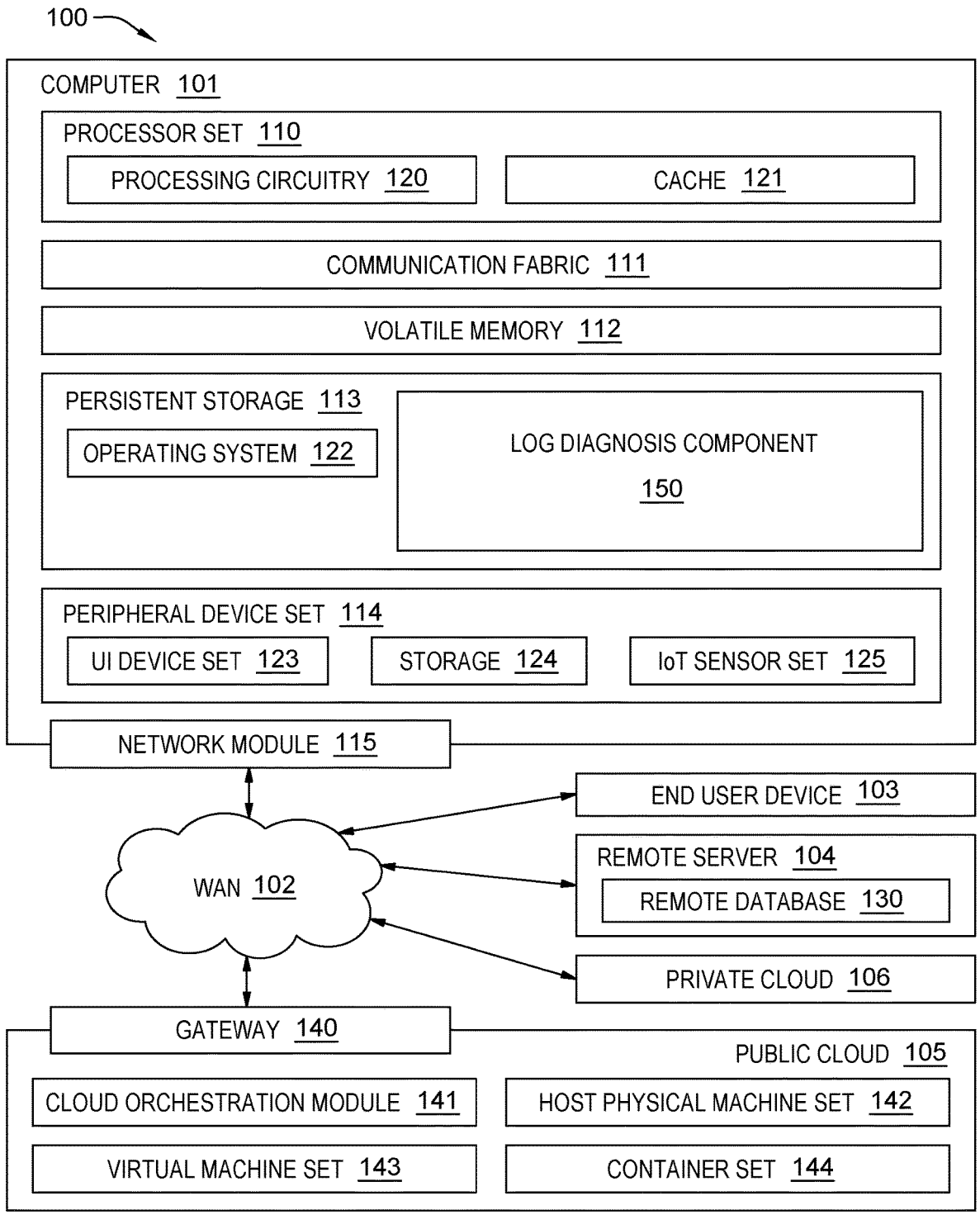
FIG. 1 depicts a cloud computing environment and a high-level architecture, in accordance with at least one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

According to an aspect of the invention, claim 1 provides a computer method for collecting diagnostic information, associated with a software system, based on identifying an abnormal log, the computer method contains the following features. A feature of predicting a first time interval associated with a current log message based on one or more trained models and a first previous log message. A feature of determining if a log is a suspected abnormal log based on the time interval. Responsive to the log being a suspected abnormal log, executing the following actions. An action of collecting additional diagnostic information based on a baseline diagnostic information collection rate. An action of determining if the log is no longer a suspected abnormal log based at least on a second time interval. Responsive to the log no longer being a suspected abnormal log, an action of returning to the baseline diagnostic information collection rate. It should be noted that the computer method described above may cause an increase in the efficiency of detecting an abnormal log associated with a computer system and may cause an increase in the efficiency of the computer system operation based an earlier detection of a problem related to the computer system operation.

In embodiments, claim 2 can extend the computer method of claim 1 and may further comprise retrieving historical logs associated with the software system, analyzing the historical logs with respect to log messages similar to the current log message, and building one or more models based on the log messages similar to the current log message. It should be noted that that the retrieving, analyzing and building features described above may are not intrinsically linked and may appear independently in different embodiments. It should further be noted that the retrieving feature has the technical effect of providing a greater information corpus for use by the method, the analyzing feature has the technical effect of providing greater resolution for identification of abnormal individual messages and the building feature has the technical effect of creating more accurate models on a per message basis.

In embodiments, claim 3 can extend the one or more models of claim 2 and may comprise a prediction model, a regression model, and a sequence model. It should be noted that embodiments may use these models independently to better predict an anomalous log.

In embodiments, claim 4 can extend the computer method of claim 2 and may further comprise one or more of calculating time intervals between message pairs of the messages in the historical logs, calculating coefficients of variation based on a ratio of a standard deviation to a mean of the message pairs, determining if a coefficient of variation exceeds a predetermined threshold, and responsive to the coefficient of variation not exceeding the predetermined threshold, building, by the one or more processors, a regression model against the first time interval. It should be noted that these features have the technical effect of determining which type of model to apply in the analysis.

In embodiments, claim 5 can extend the computer method of claim 1 and may define the types of static information as one or more logic branch numbers, a number of loop statements in source code associated with the software system, and a count of Representational State Transfer (REST) application programming interface (API) calls to other services. Independently, claim 5 can extend the computer method of claim 1 and may define the types of dynamic information as memory size of allocated objects, a count of iterated loop statements in the source code, and parameters associated with the REST API calls. It should be noted that these features have the technical effect of increasing the accuracy of the analysis.

In embodiments, claim 6 can calculate the time interval of claim 1 and may comprise determining the time interval based on a time index trend exceeding a predetermined threshold and a time index calculated with the equation $$TimeIndex = \frac{RealTime - PredictedTime}{PredictedTime}.$$

It should be noted that these features have the technical effect of improving the accuracy of calculating a coefficient of variation.

In embodiments, claim 7 can extend the computer method of claim 1 and with alternative method of determining if the log is no longer a suspected abnormal log based on a down-time-trend sequence. It should be noted that these features have the technical effect of providing an alternative determination.

According to an aspect of the invention, claim 8 provides a computer program product for collecting diagnostic information, associated with a software system, based on identifying an abnormal log, the computer program product contains the following features. A feature of one or more non-transitory computer readable storage media and program instructions stored on the one or more non-transitory computer readable storage media, the program instructions contain the following features. A feature of program instructions to predict a first time interval associated with a current log message based on one or more trained models and a first previous log message. A feature of program instructions to determine if a log is a suspected abnormal log based on the time interval. A feature of responsive to the log being a suspected abnormal log, program instructions to execute actions containing the following features. A feature of program instructions to collect additional diagnostic information based on a baseline diagnostic information collection rate. A feature of program instructions to determine if the log is no longer a suspected abnormal log based at least on a second time interval. A feature of responsive to the log no longer being a suspected abnormal log, program instructions to return to the baseline diagnostic information collection rate. It should be noted that the computer program product described above may cause an increase in the efficiency of detecting an abnormal log associated with a computer system and may cause an increase in the efficiency of the computer system operation based an earlier detection of a problem related to the computer system operation.

In embodiments, claim 9 can extend the computer program product of claim 8 and may further comprise retrieving historical logs associated with the software system, analyzing the historical logs with respect to log messages similar to the current log message, and building one or more models based on the log messages similar to the current log message. It should be noted that that the retrieving, analyzing and building features described above may are not intrinsically linked and may appear independently in different embodiments. It should further be noted that the retrieving feature has the technical effect of providing a greater information corpus for use by the method, the analyzing feature has the technical effect of providing greater resolution for identification of abnormal individual messages and the building feature has the technical effect of creating more accurate models on a per message basis.

In embodiments, claim 10 can extend the one or more models of claim 9 and may comprise a prediction model, a regression model, and a sequence model. It should be noted that embodiments may use these models independently to better predict an anomalous log.

In embodiments, claim 11 can extend the computer method of claim 9 and may further comprise one or more of calculating time intervals between message pairs of the messages in the historical logs, calculating coefficients of variation based on a ratio of a standard deviation to a mean of the message pairs, determining if a coefficient of variation exceeds a predetermined threshold, and responsive to the coefficient of variation not exceeding the predetermined threshold, building, by the one or more processors, a regression model against the first time interval. It should be noted that these features have the technical effect of determining which type of model to apply in the analysis.

In embodiments, claim 12 can extend the computer method of claim 8 and may define the types of static information as one or more logic branch numbers, a number of loop statements in source code associated with the software system, and a count of Representational State Transfer (REST) application programming interface (API) calls to other services. Independently, claim 5 can extend the computer method of claim 1 and may define the types of dynamic information as memory size of allocated objects, a count of iterated loop statements in the source code, and parameters associated with the REST API calls. It should be noted that these features have the technical effect of increasing the accuracy of the analysis.

In embodiments, claim 13 can calculate the time interval of claim 8 and may comprise determining the time interval based on a time index trend exceeding a predetermined threshold and a time index calculated with the equation $$TimeIndex = \frac{RealTime - PredictedTime}{PredictedTime}.$$

It should be noted that these features have the technical effect of improving the accuracy of calculating a coefficient of variation.

In embodiments, claim 14 can extend the computer method of claim 8 and with alternative method of determining if the log is no longer a suspected abnormal log based on a down-time-trend sequence. It should be noted that these features have the technical effect of providing an alternative determination.

According to an aspect of the invention, claim 15 provides a computer system for collecting diagnostic information, associated with a software system, based on identifying an abnormal log, the computer system contains the following features. A feature of one or more computer processors. A feature of one or more non-transitory computer readable storage media. A feature of program instructions stored on the one or more non-transitory computer readable storage media, the program instructions containing the following features. A feature of program instructions to predict a first time interval associated with a current log message based on one or more trained models and a first previous log message. A feature of program instructions to determine if a log is a suspected abnormal log based on the time interval. A feature of responsive to the log being a suspected abnormal log, program instructions to execute actions comprising. A feature of program instructions to collect additional diagnostic information based on a baseline diagnostic information collection rate. A feature of program instructions to determine if the log is no longer a suspected abnormal log based at least on a second time interval. A feature of responsive to the log no longer being a suspected abnormal log, program instructions to return to the baseline diagnostic information collection rate. It should be noted that the computer system described above may cause an increase in the efficiency of detecting an abnormal log associated with the computer system and may cause an increase in the efficiency of the computer system operation based an earlier detection of a problem related to the computer system operation.

In embodiments, claim 16 can extend the computer system of claim 15 and may further comprise retrieving historical logs associated with the software system, analyzing the historical logs with respect to log messages similar to the current log message, and building one or more models based on the log messages similar to the current log message. It should be noted that that the retrieving, analyzing and building features described above may are not intrinsically linked and may appear independently in different embodiments. It should further be noted that the retrieving feature has the technical effect of providing a greater information corpus for use by the method, the analyzing feature has the technical effect of providing greater resolution for identification of abnormal individual messages and the building feature has the technical effect of creating more accurate models on a per message basis.

In embodiments, claim 17 can extend the one or more models of claim 16 and may comprise a prediction model, a regression model, and a sequence model. It should be noted that embodiments may use these models independently to better predict an anomalous log.

In embodiments, claim 18 can extend the computer method of claim 16 and may further comprise one or more of calculating time intervals between message pairs of the messages in the historical logs, calculating coefficients of variation based on a ratio of a standard deviation to a mean of the message pairs, determining if a coefficient of variation exceeds a predetermined threshold, and responsive to the coefficient of variation not exceeding the predetermined threshold, building, by the one or more processors, a regression model against the first time interval. It should be noted that these features have the technical effect of determining which type of model to apply in the analysis.

In embodiments, claim 19 can extend the computer method of claim 15 and may define the types of static information as one or more logic branch numbers, a number of loop statements in source code associated with the software system, and a count of Representational State Transfer (REST) application programming interface (API) calls to other services. Independently, claim 5 can extend the computer method of claim 1 and may define the types of dynamic information as memory size of allocated objects, a count of iterated loop statements in the source code, and parameters associated with the REST API calls. It should be noted that these features have the technical effect of increasing the accuracy of the analysis.

In embodiments, claim 20 can calculate the time interval of claim 15 and may comprise determining the time interval based on a time index trend exceeding a predetermined threshold and a time index calculated with the equation $$TimeIndex = \frac{RealTime - PredictedTime}{PredictedTime},$$

and can extend the computer method of claim 8 and with alternative method of determining if the log is no longer a suspected abnormal log based on a down-time-trend sequence. It should be noted that these features have the technical effect of improving the accuracy of calculating a coefficient of variation and the technical effect of providing an alternative determination, respectively.

In embodiments, claim 14 can extend the computer method of claim 8 and with alternative method of determining if the log is no longer a suspected abnormal log based on a down-time-trend sequence. It should be noted that these features have the technical effect of providing an alternative determination.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as log diagnosis component 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or Open Source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
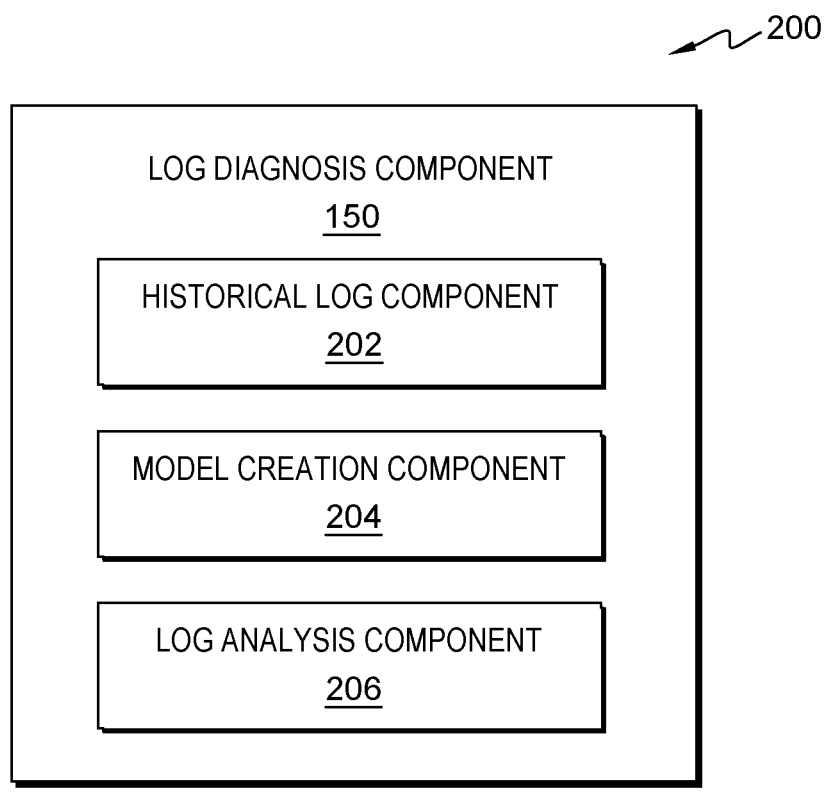
FIG. 2 depicts an exemplary detailed architecture, in accordance with at least one embodiment of the present invention.
Figure 3:
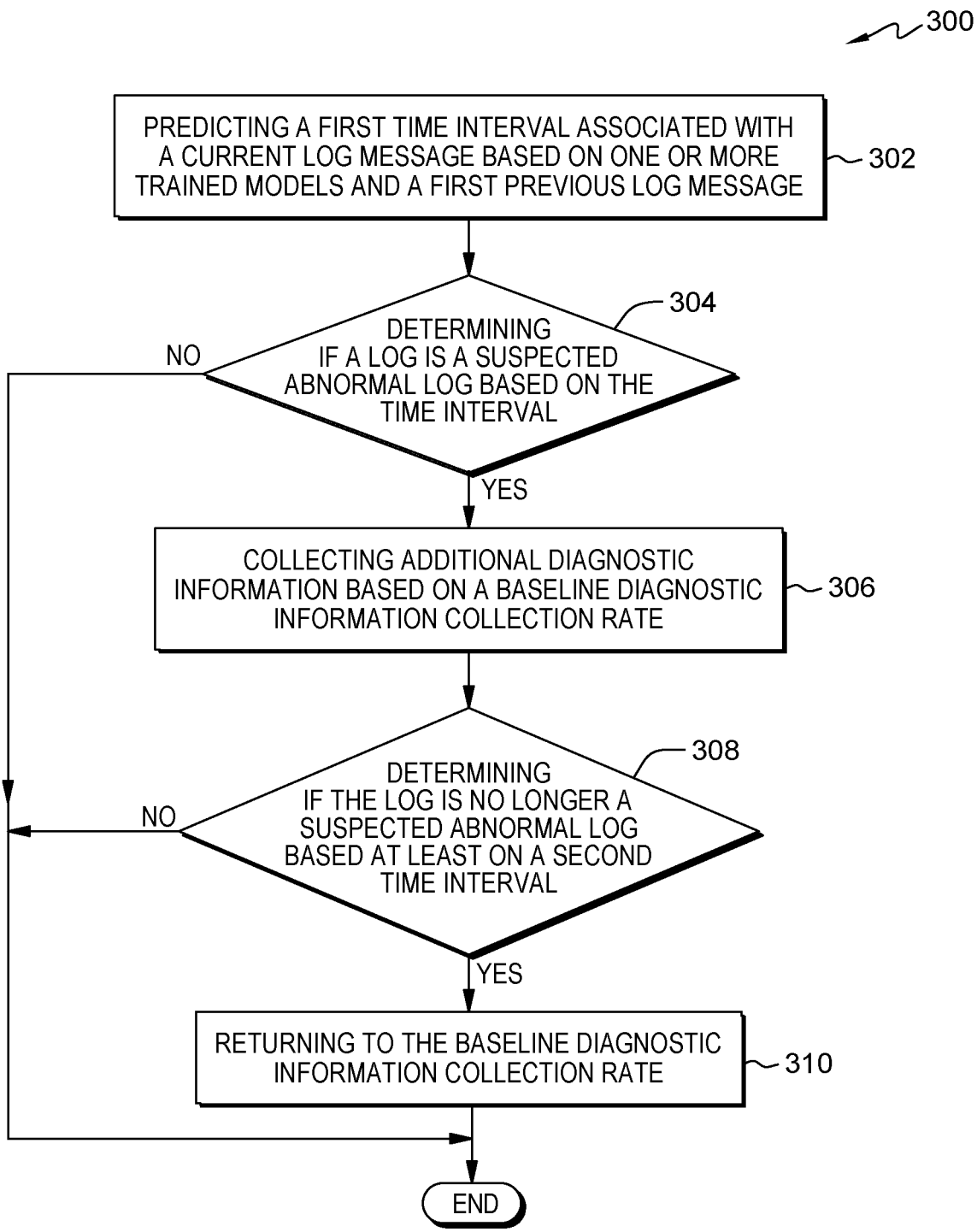
FIG. 3 is a flowchart of a method, in accordance with at least one embodiment of the present invention.

FIG. 2 is an exemplary detailed architecture for performing various operations of FIG. 3, in accordance with various embodiments. The architecture 200 may be implemented in accordance with the present invention in any of the environments depicted in FIGS. 1 and 3, among others, in various embodiments. Of course, more or less elements than those specifically described in FIG. 2 may be included in architecture 200, as would be understood by one of skill in the art upon reading the present descriptions.

Each of the steps of the method 300 (described in further detail below) may be performed by any suitable component of the architecture 200. A processor, e.g., processing circuit(s), chip(s), and/or module(s) implemented in hardware and/or software, and preferably having at least one hardware component, may be utilized in any device to perform one or more steps of the method 300 in the architecture 200. Illustrative processors include, but are not limited to, a central processing unit (CPU), an application specific integrated circuit (ASIC), a field programmable gate array (FPGA), etc., combinations thereof, or any other suitable computing device known in the art.

Architecture 200 provides a detailed view of at least some of the components of architecture 200. Architecture 200 can comprise log diagnosis component 150, which can further comprise historical log component 202, model creation component 204, and log analysis component 206.

In one aspect of an embodiment of the present invention, log diagnostic component 150 can discover a suspected abnormal log, e.g., a developing or ongoing system problem, via the use of Artificial Intelligence (AI), even though there may not be WARNING and/or ERROR messages directly indicating the system problem. In another aspect of an embodiment of the present invention, log diagnostic component 150 can provide an intelligent way to automatically demarcate beginning and ending locations of collecting diagnostic information form system files such as, but not limited to system log files. It should be noted that in addition to analyzing WARNING and ERROR messages, embodiments of the present invention can also analyze INFO messages associated with a system log file to uncover system problems not yet directly detected, e.g., a specific WARNING or ERROR message has not been logged identifying the system problem.

In one aspect of an embodiment of the present invention, log diagnostic component 150 can calculate, from retrieved and/or provided historical logs, the time interval between a log message and a next log message. In another aspect of an embodiment of the present invention, log diagnostic component 150 can analyze time interval data for a message and build a model for the message to predict the time interval to a next message. In another aspect of an embodiment of the present invention, log diagnostic component 150 can, in a production environment, predict the time interval of latest message according to the model.

In another aspect of an embodiment of the present invention, log diagnostic component 150 can check the health status of log messages, in real-time, and decide if the log is, or is becoming, a suspected abnormal log, creating a need to generate more diagnostic log messages. In one exemplary case, if the time interval of the next log message is greater than the predicted time interval and a predefined threshold, then a greater number of generated log messages can be requested. In another exemplary case, if the time interval trend of last several message sequences is rising by a predefined threshold, then a greater number of generated log messages can be requested. It should be noted that if the trend begins to decline or the time interval of the message returns to normal, both based on predefined thresholds, then a lesser number of generated log messages can be requested.

In one aspect of an embodiment of the present invention, historical log component 202 can provide the capability to collect historical logs for the normal and successful executions of the associated system. In another aspect of an embodiment of the present invention, historical log component 202 can calculate a time interval of a message and an associated next message, creating a series of historical time intervals for the collected historical logs. In another aspect of an embodiment of the present invention, historical log component 202 can calculate a coefficient of variation regarding the time interval data for the messages, to determine if there is a significant difference between time intervals for the messages associated with the historical logs.

For example, a table of log messages as indicated in Table 1

TABLE 1

| # | Log Message |
|---|---|
| A | [2023-07-11 10:58:15.261] [INFO] [sample-module] Heartbeat for runtime |
| B | [2023-07-11 10:58:30.638] [INFO] [sample-module] Successful Heartbeat |
| C | [2023-07-11 11:01:15.033] [INFO] [sample-module] Total disk space 460 |
| D | [2023-07-11 11:02:05.467] [INFO] [sample-module] Total memory 370 MB |
| E | [2023-07-11 11:02:14.814] [INFO] [sample-module] Client Start |
| F | [2023-07-11 11:02:31.173] [INFO] [sample-module] REQUEST GET /service/session |
| G | [2023-07-11 11:03:19.068] [INFO] [sample-module] Returning results |
| H | [2023-07-11 11:04:35.103] [INFO] [sample-module] Return OK. Status 200 | can be used to calculate corresponding message time intervals, shown in Table 2.

TABLE 2

| # | Time Interval (seconds) |
|---|---|
| A_B | 15.377 |
| B_C | 164.395 |
| C_D | 50.434 |
| D_E | 9.347 |
| E_F | 16.359 |
| F_G | 47.895 |
| G_H | 16.035 |

Then, as described above, a collection of historical logs, collected during normal and successful executions, can be analyzed to calculate a set of time interval values for each message pair, e.g., A_B: 15.377, 16.223, 16.956, 14.807, 15.422, 16.308, 15.257, 15.311, 15.8, 14.9, etc.

In one aspect of an embodiment of the present invention, historical log component 202 can provide the capability to calculate the coefficient of variation of the time interval data for the messages. In another aspect of an embodiment of the present invention, historical log component 202 can determine, based on the coefficient of variation if there is a threshold difference for the time interval data of the messages associated with the historical logs.

In one aspect of an embodiment of the present invention, historical log component 202 can calculate the coefficient of variation (CV) based on the equation $$c_v = \frac{\sigma}{\mu},$$

wherein σ is the standard deviation and y is the mean. In another aspect of an embodiment of the present invention, historical log component 202 can determine if the coefficient of variation is greater than a predetermined threshold, e.g., 15%. It should be noted that if the coefficient of variation exceeds the predetermined threshold, then collection of additional information is required to build a regression model, as described subsequently by model creation component 204, based on, i.e., against, the time interval.

In one aspect of an embodiment of the present invention, historical log component 202, upon determining there is a threshold difference among coefficient of variation values, can collect additional information, e.g., software source code implementation information associated with the software locations generating the log messages, including static information such as, but not limited to logic branch number, number of loop statements, e.g., "for," "while," etc. in the software source code, Representational State Transfer (REST) application programming interface (API) calls to other services in the software source code, etc. and dynamic information such as, but not limited to memory size of used, e.g., allocated, objects in the software source code, total iterated number of loop statements in the software source code, parameters in identified REST API calls, etc. It should be noted that the additional information can be used by model creation component 204, described subsequently, to build a regression model for log message analysis.

In another aspect of an embodiment of the present invention, model creation component 204 can provide the capability to apply a different model based on the previously calculated time intervals for a message and the coefficient of variation associated with the message. It should be noted that if the historical data time interval values, as calculated above, have difference less than or equal to a predetermined threshold, then model creation component 204 can create a prediction model that can use the mean value and its associated standard error as a constant prediction result, or if the historical data has a difference greater than the predetermined threshold, then model creation component 204 can collect factors affecting the time interval, e.g., parameter count in the associated software source code or the object memory, and create a model using these factors as the predictors, with the time interval as a target, to build a regression model.

In another aspect of an embodiment of the present invention, model creation component 204 can provide the capability to build a sequence model for the log message sequence. It should be noted that the sequence model can be a many-to-one sequence model based on a recurrent neural network.

In one aspect of an embodiment of the present invention, log analysis component 206 can provide the capability, in a production environment, to identify a suspected abnormal log based on the above-described models. If a suspected abnormal log is found, log analysis component 206 can request additional diagnostic Information via historical log component 202. It should be noted that if the suspected abnormal log returns to normal, then log analysis component 206 can request, via historical log component 202 that diagnostic information collection also return to normal.

In another aspect of an embodiment of the present invention, log analysis component 206 can determine a log is abnormal based on starting a daemon process that can check a suspected abnormal log.

In one example, log analysis component 206 can detect a suspected log based on situations such as, but not limited to, identifying that a next log message is not received in a time determined based on the CV value being less than the pre-defined threshold, when the time is larger than the sum of the mean time and the product of three and the standard error; the CV value is larger than a predetermined threshold, when the time is larger than the upper confidence interval of a prediction value.

In another example, log analysis component 206 can detect a suspected log based on situations such as, but not limited to, if the log messages come as expected in time, analyze a sequence of the last N messages, based on computing time indexes for associated time intervals using the equation:

$$TimeIndex = \frac{RealTime - PredictedTime}{PredictedTime}$$

Further, use a Time Series analysis to determine the trend of the time series. If the trend value, e.g., slope value, is larger than a pre-defined threshold, e.g., abnormal upward trend, then the log can be identified as a suspected abnormal log.

In another example, if there are multiple branches after a message, log analysis component 206 can provide the capability to predict which message will arrive next. Log analysis component 206 can base a prediction on building a sequence model using historical data, predicting next messages based on the sequence model and selecting a message with the highest probability. After predicting the next message, log analysis component 206 can determine if the log is a suspected abnormal log based on using either the mean/standard error value or a corresponding regression model as described above. It should be noted that if a suspected abnormal log is identified, then log analysis component 206 can request, via historical log component 202 collection of additional historical log data. It should further be noted that if the suspected abnormal log returns to normal, then log analysis component 206 can request, via historical log component 202 that diagnostic information collection also return to normal.

In another aspect of an embodiment of the present invention, log analysis component 206 can determine if a log is no longer suspected abnormal, i.e., returned to normal in one of two ways. The first can be described as if the suspected abnormal log was determined based on an out-of-range time interval, then the log can be considered back to normal either the time interval is back into the range of the mean value plus or minus the product of three and the standard error, and if the CV value is less than the predetermined threshold or if the time interval is back into the range of confidence interval of the prediction value, then if the CV value is larger than the threshold value. The second can be described as if the suspected abnormal log is caused by an up-time-trend sequence, then after the trend becomes a down-time-trend sequence, we can treat the log as back to normal.

FIG. 3 is an exemplary flowchart of a method 300 for collecting diagnostic information, associated with a software system, based on identifying an abnormal log. At step 302, an embodiment can predict, via historical log component 202, a first time interval associated with a current log message based on one or more trained models and a first previous log message. At step 304, the embodiment can determine, via historical log component 202, if a log is a suspected abnormal log based on the time interval. At step 306, the embodiment can collect, via historical log component 202, additional diagnostic information based on a baseline diagnostic information collection rate. At step 308, the embodiment can determine, via log analysis component 206, if the log is no longer a suspected abnormal log based at least on a second time interval. At step 310, the embodiment can return, via log analysis component 206, to a baseline diagnostic information collection rate.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for collecting diagnostic information, associated with a software system, based on identifying an abnormal log, the computer-implemented method comprising:

predicting, by one or more processors, a first time interval associated with a current log message based on one or more trained models and a first previous log message;

determining, by the one or more processors, if a log is a suspected abnormal log based on the first time interval; and responsive to the log being a suspected abnormal log, executing, by the one or more processors, actions comprising:

collecting, by the one or more processors, additional diagnostic information based on a baseline diagnostic information collection rate;

determining, by the one or more processors, if the log is no longer a suspected abnormal log based at least on a second time interval; and responsive to the log no longer being a suspected abnormal log, returning, by the one or more processors, to the baseline diagnostic information collection rate.

2. The computer-implemented method of claim 1, further comprising:

retrieving, by the one or more processors, historical logs associated with the software system;

analyzing, by the one or more processors, the historical logs with respect to log messages similar to the current log message; and building, by the one or more processors, one or more models based on the log messages similar to the current log message.

3. The computer-implemented method of claim 2, wherein the one or more models comprise a prediction model, a regression model, and a sequence model.

4. The computer-implemented method of claim 2, wherein the analyzing further comprises:

calculating, by the one or more processors, time intervals between message pairs of the log messages in the historical logs;

calculating, by the one or more processors, coefficients of variation based on a ratio of a standard deviation to a mean of the message pairs;

determining, by the one or more processors, if a coefficient of variation exceeds a predetermined threshold; and responsive to the coefficient of variation not exceeding the predetermined threshold, building, by the one or more processors, a regression model against the first time interval.

5. The computer-implemented method of claim 1, wherein the additional diagnostic information comprises:

static information comprising:
one or more logic branch numbers;
a number of loop statements in source code associated with the software system;
a count of Representational State Transfer (REST) application programming interface (API) calls to other services; and dynamic information comprising:
memory size of allocated objects;
a count of iterated loop statements in the source code; and
parameters associated with the REST API calls.

6. The computer-implemented method of claim 1, wherein the first time interval is determined based on a time index trend exceeding a predetermined threshold and a time index is calculated based on an equation $$TimeIndex = \frac{RealTime - PredictedTime}{PredictedTime}.$$

7. The computer-implemented method of claim 1, wherein determining if the log is no longer a suspected abnormal log is further based on a down-time-trend sequence.

8. A computer program product for collecting diagnostic information, associated with a software system, based on identifying an abnormal log, the computer program product comprising:

one or more non-transitory computer readable storage media and program instructions stored on the one or more non-transitory computer readable storage media, the program instructions comprising:

program instructions to predict a first time interval associated with a current log message based on one or more trained models and a first previous log message;

program instructions to determine if a log is a suspected abnormal log based on the first time interval; and responsive to the log being a suspected abnormal log, program instructions to execute actions comprising:

program instructions to collect additional diagnostic information based on a baseline diagnostic information collection rate;

program instructions to determine if the log is no longer a suspected abnormal log based at least on a second time interval; and responsive to the log no longer being a suspected abnormal log, program instructions to return to the baseline diagnostic information collection rate.

9. The computer program product of claim 8, further comprising:

program instructions to retrieve historical logs associated with the software system;

program instructions to analyze the historical logs with respect to log messages similar to the current log message; and program instructions to build one or more models based on the log messages similar to the current log message.

10. The computer program product of claim 9, wherein the one or more models comprise a prediction model, a regression model, and a sequence model.

11. The computer program product of claim 9, wherein the program instructions to analyze further comprises:

program instructions to calculate time intervals between message pairs of the log messages in the historical logs;

program instructions to calculate coefficients of variation based on a ratio of a standard deviation to a mean of the message pairs;

program instructions to determine if a coefficient of variation exceeds a predetermined threshold; and responsive to the coefficient of variation not exceeding the predetermined threshold, program instructions to build a regression model against the first time interval.

12. The computer program product of claim 8, wherein the additional diagnostic information comprises:

static information comprising:
one or more logic branch numbers;
a number of loop statements in source code associated with the software system;
a count of Representational State Transfer (REST) application programming interface (API) calls to other services; and dynamic information comprising:
memory size of allocated objects;
a count of iterated loop statements in the source code; and
parameters associated with the REST API calls.

13. The computer program product of claim 8, wherein the first time interval is determined based on a time index trend exceeding a predetermined threshold and a time index is calculated based on an equation $$TimeIndex = \frac{RealTime - PredictedTime}{PredictedTime}.$$

14. The computer program product of claim 8, wherein program instructions to determine if the log is no longer a suspected abnormal log is further based on a down-time-trend sequence.

15. A computer system for collecting diagnostic information, associated with a software system, based on identifying an abnormal log, the computer system comprising:
   one or more computer processors;
   one or more non-transitory computer readable storage media; and
   program instructions stored on the one or more non-transitory computer readable storage media, the program instructions comprising:
      program instructions to predict a first time interval associated with a current log message based on one or more trained models and a first previous log message;
      program instructions to determine if a log is a suspected abnormal log based on the first time interval; and
      responsive to the log being a suspected abnormal log, program instructions to execute actions comprising:
         program instructions to collect additional diagnostic information based on a baseline diagnostic information collection rate;
         program instructions to determine if the log is no longer a suspected abnormal log based at least on a second time interval; and
         responsive to the log no longer being a suspected abnormal log, program instructions to return to the baseline diagnostic information collection rate.

16. The computer system of claim 15, further comprising:
   program instructions to retrieve historical logs associated with the software system;
   program instructions to analyze the historical logs with respect to log messages similar to the current log message; and
   program instructions to build one or more models based on the log messages similar to the current log message.

17. The computer system of claim 16, wherein the one or more models comprise a prediction model, a regression model, and a sequence model.

18. The computer system of claim 16, wherein the program instructions to analyze further comprises:
   program instructions to calculate time intervals between message pairs of the log messages in the historical logs;
   program instructions to calculate coefficients of variation based on a ratio of a standard deviation to a mean of the message pairs;
   program instructions to determine if a coefficient of variation exceeds a predetermined threshold; and
   responsive to the coefficient of variation not exceeding the predetermined threshold, program instructions to build a regression model against the first time interval.

19. The computer system of claim 15, wherein the additional diagnostic information comprises:
   static information comprising:
      one or more logic branch numbers;
      a number of loop statements in source code associated with the software system;
      a count of Representational State Transfer (REST) application programming interface (API) calls to other services; and
   dynamic information comprising:
      memory size of allocated objects;
      a count of iterated loop statements in the source code; and
      parameters associated with the REST API calls.

20. The computer system of claim 15, wherein the first time interval is determined based on a time index trend exceeding a predetermined threshold and a time index is calculated based on an equation $$TimeIndex = \frac{RealTime - PredictedTime}{PredictedTime},$$

and wherein program instructions to determine if the log is no longer a suspected abnormal log is further based on a down-time-trend sequence.

* * * * *